United States Patent
Acharya

(10) Patent No.: US 7,783,623 B2
(45) Date of Patent: Aug. 24, 2010

(54) SYSTEM AND METHOD FOR RECOMMENDING SONGS

(75) Inventor: Soam Acharya, San Bruno, CA (US)

(73) Assignee: Yahoo! Inc., Sunnyvale, CA (US)

( * ) Notice: Subject to any disclaimer, the term of this patent is extended or adjusted under 35 U.S.C. 154(b) by 434 days.

(21) Appl. No.: 11/848,973

(22) Filed: Aug. 31, 2007

(65) Prior Publication Data

US 2009/0063459 A1   Mar. 5, 2009

(51) Int. Cl.
*G06F 17/30* (2006.01)
(52) U.S. Cl. .................. 707/709; 707/754; 707/798; 84/609
(58) Field of Classification Search .......... 707/709, 707/754, 798; 84/609
See application file for complete search history.

(56) References Cited

U.S. PATENT DOCUMENTS

| | | | | |
|---|---|---|---|---|
| 2003/0041095 A1* | 2/2003 | Konda et al. | ............... | 709/201 |
| 2003/0188625 A1* | 10/2003 | Tucmandl | ............... | 84/609 |
| 2005/0071465 A1* | 3/2005 | Zeng et al. | ............... | 709/224 |
| 2006/0080356 A1* | 4/2006 | Burges et al. | ............... | 707/103 R |
| 2006/0112082 A1* | 5/2006 | Platt et al. | ............... | 707/3 |
| 2006/0112098 A1* | 5/2006 | Renshaw et al. | ............... | 707/7 |
| 2007/0192280 A1* | 8/2007 | Agrawal et al. | ............... | 707/2 |
| 2008/0294655 A1* | 11/2008 | Picault et al. | ............... | 707/100 |
| 2009/0006290 A1* | 1/2009 | Gunawardana et al. | ....... | 706/14 |
| 2009/0277322 A1* | 11/2009 | Cai et al. | ............... | 84/609 |

* cited by examiner

*Primary Examiner*—Don Wong
*Assistant Examiner*—Hanh B Thai
(74) *Attorney, Agent, or Firm*—James J. DeCarlo; Greenberg Traurig, LLP

(57) ABSTRACT

A system and method, operable by a processor running on a computing device and stored on a tangible computer readable medium, the system and method creating continuous, fixed duration, fixed size, or other such playlists for use on an individual listener's portable music player, as a programming guide for an Internet radio station, or the like. Information can be drawn from a number of recommendation sources to help generate such playlists based on a dictionary of terms. Recommendation sources are sources available via the internet or other published information that identify the order in which songs are presented or played, and which may be aggregated and processed into song sequence data that allows the instant system and method to utilize the experience, effort and musical expertise of others to generate a continuous playlist. Exemplary recommendation sources include, but are not limited to, published Disc Jockey ("DJ") playlists, radio (terrestrial, satellite or internet) station websites from which playlists can be extracted or derived, individual listener playlists, or the like.

25 Claims, 5 Drawing Sheets

SYSTEM AND METHOD FOR RECOMMENDING SONGS

This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The instant disclosure relates to the field of digital music, and more particularly to systems and methods for recommending songs and the order in which they are played.

BACKGROUND

The popularity of digital music has made it possible for the average music listener to amass a large number of songs on their computer, portable media player, or other device. Digital music has also led to the introduction of online digital music services that make vast libraries of songs available to the listener at the click of a button. Although the increased availability of music is generally beneficial, the sheer number of song choices available to the listener can be overwhelming, which can lead to the listener only listening to a small subset of the available music.

Creating a playlist comprising a random list of a listener's music collection is one method that has been used in the prior art to expose the listener to a wider array of songs. Unfortunately, a playlist based on a simple randomization of the songs in a music library typically results in poor song sequencing, in that a subsequent song may be selected from a different genre, tempo, or the like. For example, randomization may place a heavy metal song directly after a classical piano song, leading to a less than desirable listening experience.

Although listeners enjoy much of the music in their personal libraries, they frequently also like to hear music from their favorite artists, or music that is similar in style to their favorite or preferred music. In some instances, listener-preferred music types (e.g., genre, tempo, artists, etc.) may change depending on the listener's environment. By way of example, without limitation, a listener may prefer classical music to be played while the listener is at his or her job; news, political and/or sports talk programs while driving during the week; heavy metal while at the gym; and a combination of bluegrass and zydeco while driving on the weekend.

SUMMARY

Accordingly, the instant disclosure is directed to a system and method for mining available song sequence data to facilitate recommending songs that substantially obviates one or more of the problems due to limitations and disadvantages of the related art.

Developing a playlist in which a first song transitions seamlessly into a second song can involve a significant amount of effort on the part of the listener. A number of factors might be considered, such as artist, genre, tempo, audio level, how well the ending of the first song matches the beginning of the second song, or the like. Developing such a playlist may require more effort than a listener is willing to invest or may be beyond the means of the listener. Still further, as new songs are released and listeners become jaded to older songs, the refreshing of such playlists can become a daunting task. The instant system and method can create continuous, fixed duration, fixed size, or other such playlists. Such playlists may be created for a variety of purposes, including, without limitation, for an individual listener's use on a portable music player, or as a programming guide for an Internet radio station. The instant system and method can draw on information from a number of recommendation sources to help generate such playlists. Recommendation sources are sources available via the internet or other published information that identify the order in which songs are presented or played, and which may be aggregated and processed into song sequence data that allows the instant system and method to utilize the experience, effort and musical expertise of others to generate a continuous playlist. Exemplary recommendation sources include, but are not limited to, published Disc Jockey ("DJ") or celebrity playlists, radio (terrestrial, satellite or internet) station websites from which playlists can be extracted or derived, album track lists, individual listener playlists, or the like.

Additional features and advantages of the invention will be set forth in the description which follows, and in part will be apparent from this disclosure, or may be learned by practice of the invention. The objectives and other advantages of the invention will be realized and attained by the structure particularly pointed out in this written description, including any claims contained herein and the appended drawings.

Some embodiments comprise computer program process code tangibly stored on computer readable media and interpretable by a processor running on a computing device, the computer program process code comprising instructions for recommending songs, the instructions comprising modules for implementing a dictionary comprising a plurality terms; a crawler capable of extracting song sequence data from a plurality of recommendation sources based on the plurality of terms stored in the dictionary; a database, the database further comprising a song graph, the song graph being generated by the crawler, the song graph comprising a plurality of song nodes, each song node representing a song and at least a subset of the plurality of song nodes sharing an edge with at least one other song node, each edge representing a sequence relationship from the extracted song sequence data; and a recommendation engine, the recommendation engine capable of receiving an input node and providing a song recommendation by selecting a next node from the song graph. In some embodiments, at least a subset of the song nodes may further comprise metadata. At least a subset of the song node edges may also have a weight associated therewith. Such weighting and metadata information can be used by the recommendation engine to perform a weighted random walk of songs sharing an edge with the input node when selecting a next song from the song graph, the weighting provided by the weight of each edge associated with the input node.

In some embodiments, the computer program process code may further comprise instructions for storing a set of listener preferences and instructions allowing the recommendation engine to apply the listener preferences when providing a song recommendation. In some embodiments, when a next node is selected which does not share an edge with another song node, or when listener preferences prevent selection of any potential next song nodes, the computer program process code may include instructions which allow a next song to be selected by referring to an artist graph, which has also been generated by information from the crawler, the artist graph comprising a plurality of artist nodes. Each artist node may further comprise metadata and at least a subset of the artist nodes may also comprise at least one edge which is shared with at least one other artist node. The edges may have weights associated therewith, in a manner similar to the song nodes. In such embodiments, the recommendation engine can perform a weighted random walk along the artist graph based on the artist associated with the input node if the listener preferences prevent the selection of any song nodes sharing an edge with the input node or if no edges are associated with the input node.

In some embodiments, the plurality of dictionary terms may comprise terms provided by a music selection source.

In some embodiments, the recommendation sources may be stored in an ordered crawl list, and at least a subset of the recommendation sources in the ordered crawl list may have a weight associated therewith. The weight associated with a song node can be based, at least in part, on the weight associated with the recommendation source contributing a song to the song graph. At least a subset of the recommendation sources may comprise an online music service song library and/or a listener song library.

Some embodiments may comprise computer program process code, tangibly stored on at least one computer readable medium and executable by a processor running on a computing device, the computer program process code comprising instructions for extracting song sequence data from a plurality of recommendation sources based on at least a subset of the contents of a dictionary; generating a song graph, the song graph comprising a plurality of song nodes, each song node representing a song and at least a subset of the song nodes sharing an edge with at least one other song node, each such edge representing sequence relationships from the extracted song sequence data; and, selecting a next song for presentation to a listener by receiving a first song; selecting as an input node the song node corresponding to the first song; selecting a next song node by performing a random walk from the input node to a song node sharing an edge with the input node; and, selecting the song associated with the selected next song node to the listener.

In some embodiments, the selected next song may be stored in a playlist, rather than immediately played for a listener. Some embodiments may further comprise iteratively equating the selected next song node to the input node; selecting a next song node by performing a random walk from the input node to a song node sharing an edge with the input node; and, storing the song associated with the selected next song node in the playlist. This process can be repeated until a playlist of a desired play length has been created, a playlist comprising songs of an aggregate size has been created, or the like.

In some embodiments the computer program process code may further comprise instructions for generating a dictionary, the dictionary comprising a plurality of terms provided by a music selection source such as, without limitation, an online music service song library or a listener song library.

Some embodiments may further comprise instructions for filtering the edges associated with the input node based upon criteria selected by the listener and metadata associated with each input node; selecting the next song node by performing a weighted random walk along the artist graph if filtering the edges associated with the input node eliminates all of the edges associated with the input node or if no edges are associated with the input node; and, selecting as the next song the song associated with the next song node.

In some embodiments, the dictionary, database, crawler, and recommendation engine may be implemented by a processor running on a listener device. In some embodiments, the dictionary, database, crawler, and recommendation engine may be implemented by a processor running on a server. In some embodiments, the dictionary, database, and crawler are implemented by a processor running on a server, while the recommendation engine is implemented by a processor running on a listener device.

Some embodiments comprise a method for selecting a next song comprising extracting song sequence data from a plurality of recommendation sources based on at least a subset of the contents of a dictionary; generating a song graph, the song graph comprising a plurality of song nodes, each song node representing a song and at least a subset of the song nodes sharing an edge with at least one other song node, each such edge representing sequence relationships from the extracted song sequence data; and, selecting a next song to be presented to a listener by receiving a first song; selecting as an input node the song node corresponding to the received song; selecting a next song node by performing a random walk from the input node to a song node sharing an edge with the input node; and, selecting as the next song the song associated with the selected next song node.

Some embodiments comprise a system for selecting next songs comprising a server, the server further comprising a dictionary comprising a plurality terms; a crawler capable of extracting song sequence data from a plurality of recommendation sources based on the plurality of terms stored in the dictionary; and, a database, the database further comprising a song graph, the song graph being generated by the crawler, the song graph comprising a plurality of song nodes, each song node representing a song and at least a subset of the song nodes sharing an edge with at least one other song node, each such edge representing sequence relationships from the extracted song sequence data. Some embodiments may further comprise a recommendation engine, the recommendation engine receiving an input node and selecting a next song by selecting a next node from the song graph and selecting as the next song the song corresponding to the next node. In some embodiments, the server may further comprise the recommendation engine, and in some embodiments the listener device may comprise the recommendation engine.

It is to be understood that both the foregoing general description and the following detailed description are exemplary and explanatory and are intended to provide further explanation of the disclosed system and method for recommending songs.

BRIEF DESCRIPTION OF THE DRAWINGS

The accompanying drawings, which are included to provide a further understanding of the disclosed system and method for recommending songs and are incorporated in and constitute a part of this specification, illustrate various embodiments and, together with the description, serve to explain the principles of at least one embodiment of the disclosed system and method for recommending songs.

In the drawings.

DETAILED DESCRIPTION

Figure 1:
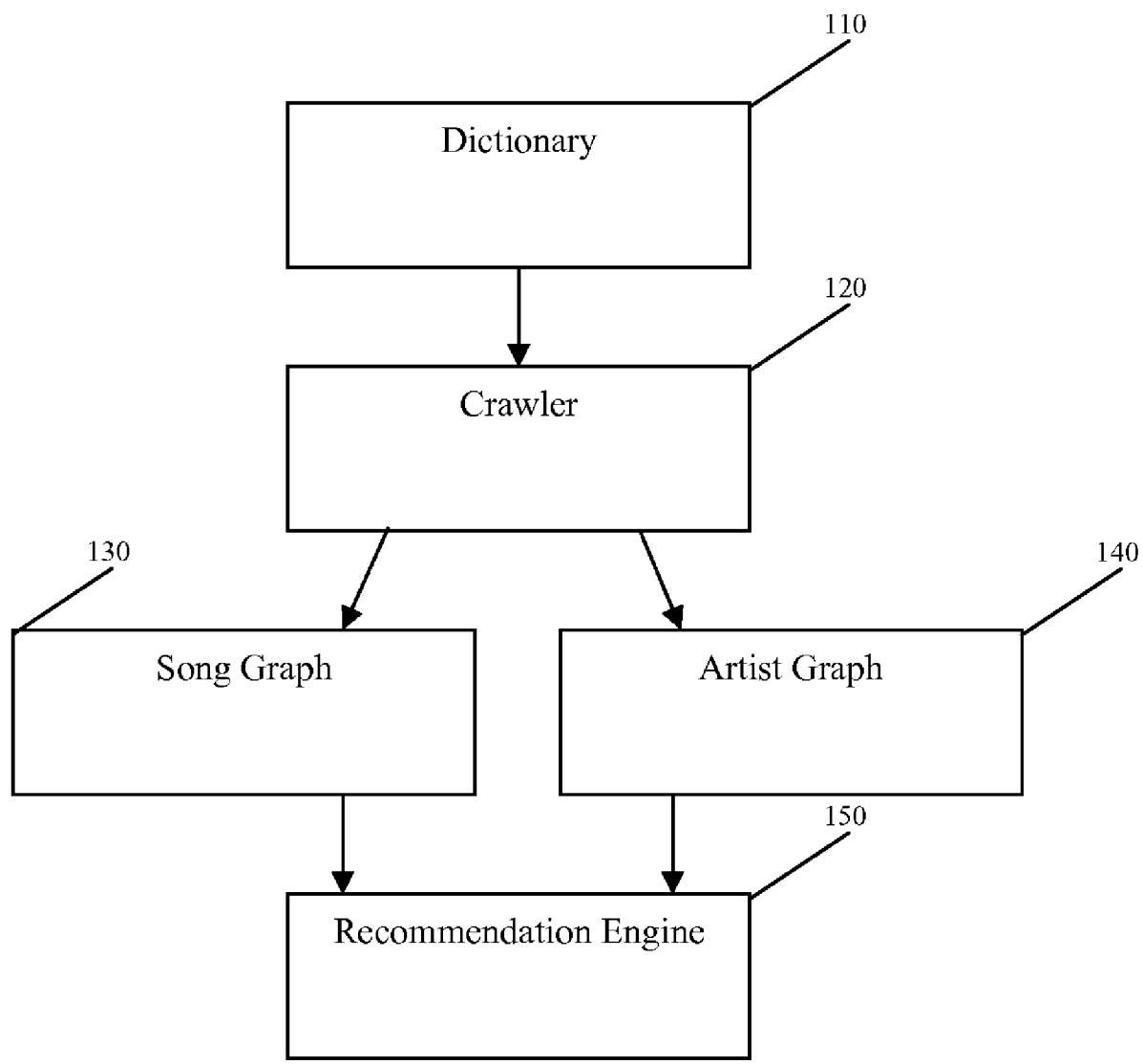
FIG. 1 is a block diagram illustrating software component modules for recommending songs in accordance with an embodiment.

Reference will now be made in detail to embodiments of the disclosed system and method for recommending songs, examples of which are illustrated in the accompanying drawings.

Developing a playlist which seamlessly, or at least pleasantly, transitions from song to song can involve a significant amount of effort on the part of a listener, radio station disc jockey, or other such person (referred to collectively herein as a "listener" for clarity). A number of factors might be considered when developing such a playlist, such as artist, genre, tempo, audio level, how well the ending of the first song matches the beginning of the second song, or the like. As a result, developing such a playlist may require more effort than a listener is willing to invest or may be beyond the means of the listener. Still further, as new songs are released and listeners become jaded to older songs, the refreshing of such playlists can become a daunting task. The instant system and method can create continuous playlists for a variety of purposes, including, without limitation, for an individual listener's use on a portable music player, or as a programming guide for an Internet radio station. The instant system and method can draw on information from a number of recommendation sources to help generate such playlists. Recommendation sources are sources available via the internet or other published information that identify the order in which songs are presented or played, and which may be aggregated and processed into song sequence data that allows the instant system and method to utilize the experience, effort and musical expertise of others to generate a continuous playlist. Exemplary recommendation sources include, but are not limited to, published Disc Jockey ("DJ") or celebrity playlists, radio (terrestrial, satellite or internet) station websites from which playlists can be extracted or derived, album track lists, individual listener playlists, or the like.

There are many sources of information that a music listener can utilize to attempt to locate new songs that satisfy the listener's own personal preferences. These sources can also frequently be used to provide song sequence data for assembling playlists. By way of example, without limitation, some radio station web sites include a chronological list of what songs were played during some recent time period, such as the last day. College and Internet radio stations may be seen as more desirable sources of such information because their playlists tend to be less influenced by revenue generation. For example, many college radio stations have shows that feature new artists and/or musical styles that are outside of those typically presented on commercial radio stations. Online user playlists, whether stored specifically in a playlist repository, such as Yahoo! Music or posted on a web site, e.g., a DJ message board, blog, or the like, also constitute sources of playlist sequencing information. In addition, online services such as freedb store track listings of albums from record labels as well CDs created by users. These sequences are also useful sources of sequence information. The instant system and method can mine such recommendation data sources to create recommended playlist sequences.

FIG. 1 is a block diagram illustrating software component modules for recommending songs and/or building playlists according to some embodiments. As described in detail below, dictionary 110 comprises a list of artist names and song titles. A crawler 120 utilizes dictionary 110 to locate and extract song sequence data from a plurality of recommendation sources. Crawler 120 can be an automated program that accesses and retrieves information from recommendation sources contained in a crawl list. Crawler 120 generates a song graph 130 and an artist graph 140 from the extracted song sequence data. Recommendation engine 150 can then recommend songs based upon information contained in song graph 130 and artist graph 140, along with listener supplied criteria.

Figure 2A:
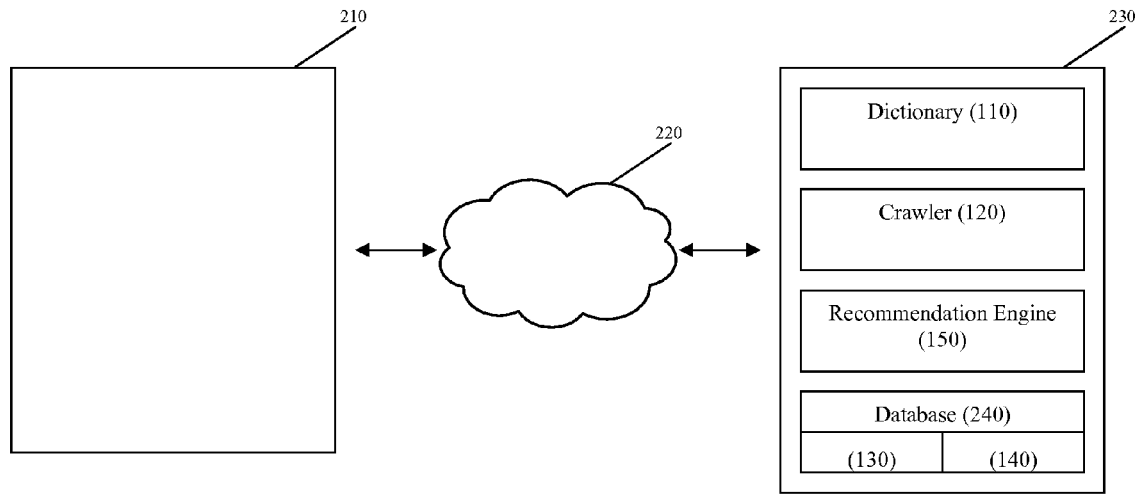
FIG. 2a is a diagram illustrating a system architecture for recommending songs in accordance with an embodiment.
Figure 2B:
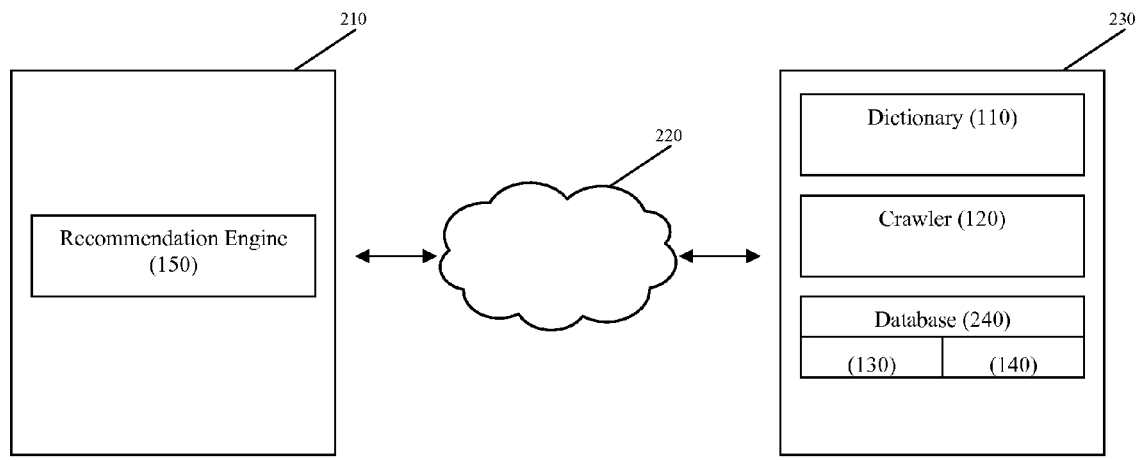
FIG. 2b is a diagram illustrating a system architecture for recommending songs in accordance with an embodiment.

In some embodiments, as illustrated in FIGS. 2a-2b, a system architecture for recommending songs can comprise a listener computing device 210 and a server 230, both of which are communicatively coupled to a communication network 220. Song recommendations are provided to listener computing device 210 via communication network 220. Communications network 220 can be a private network or non-private network, such as, but not limited to, the Internet.

Listener computing device 210 and server 230 can be communicatively coupled to communications network 220 via a variety of means including, without limitation, high-speed wired and wireless communications employing the 802.11 series of standards published by the Institute of Electrical and Electronics Engineers ("IEEE"), cellular telephony, digital data encoded by modulating an analog telephone carrier signal using a modem, or the like. In addition, some or all parts of communications taking place over communications network 220 may be secured using a variety of secure communications methods including, without limitation, Virtual Private Networking ("VPN"), Secure Sockets Layer ("SSL"), the Advanced Encryption Standard ("AES"), Triple Data Encryption Standard ("3DES"), or the like.

In some embodiments, as illustrated in FIG. 2a, server 230 can comprise dictionary 110, crawler 120, recommendation engine 150, and a database 240. Database 240 can comprise song graph 130 and artist graph 140. Database engines capable of handling such data include, but are not limited to, Microsoft Access or Microsoft SQL Server distributed by Microsoft Corporation of Redmond, Wash., Oracle Database distributed by Oracle Corporation of Redwood Shores, Calif., or MySQL distributed by MySQL Inc. of Cupertino, Calif.

In some embodiments, as illustrated in FIG. 2b, recommendation engine 150 is provided on listener computing device 210. In some embodiments, recommendation engine 150 accesses database 240 via communication network 220 to access song graph 130, artist graph 140, and related information stored therein or associated therewith.

In some embodiments, the above described functionality associated with server 230 may be provided by multiple servers to scale the system architecture to meet listener demand. Furthermore, individual components of server 230, e.g., crawler 120, may be provided by a separate server or group of servers.

Still other embodiments may allow database 240 and recommendation engine 150 to reside locally on a listener's computing device. In such embodiments, the computing device can, for example, dynamically play a stream of content, in a listener-desirable order, from a listener library without necessitating additional listener interaction or interaction with external devices or systems.

Figure 3:
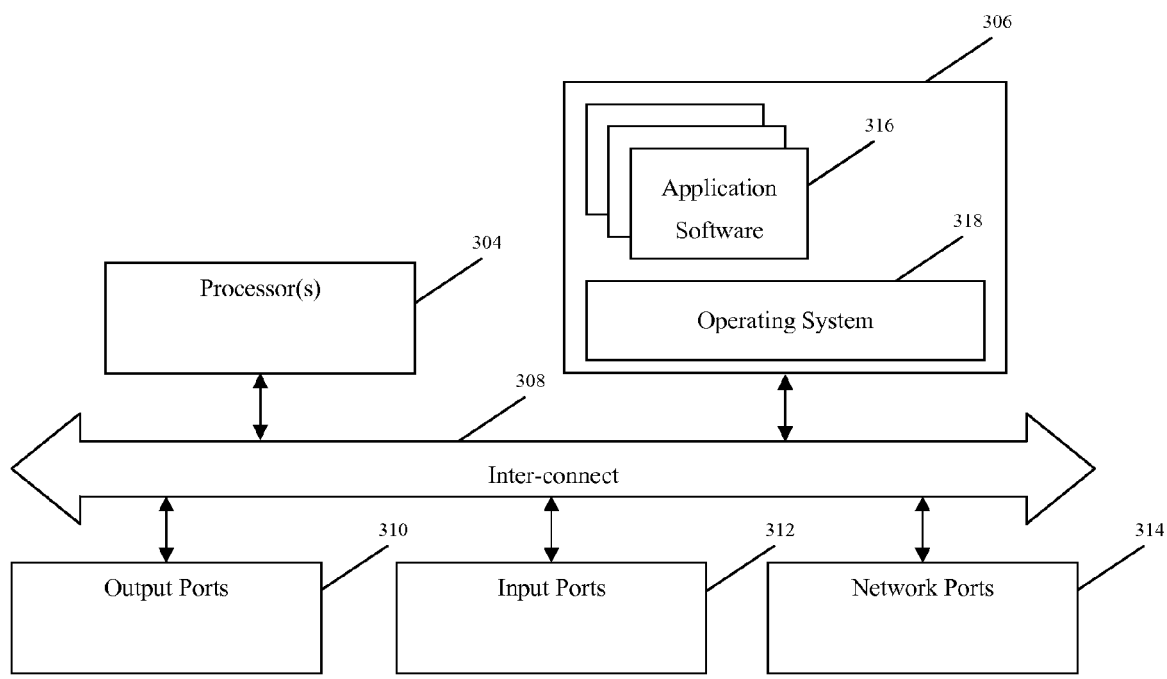
FIG. 3 is a component diagram of a listener computing device in accordance with an embodiment.

FIG. 3 illustrates a component diagram of listener computing device 210, according to some embodiments. Listener computing device 210 can comprise one or more computing devices, computer processes, or software modules described herein. In one example, listener computing device 210 can be utilized to process calculations, execute instructions, receive and transmit digital signals, as required by recommendation engine 150.

Listener computing device 210 can be any general or special purpose computer now known or to become known capable of performing the steps and/or performing the functions described herein, either in software, hardware, firmware, or combinations thereof. Exemplary user computing devices include, without limitation, personal computers, portable digital assistants, personal music players, cellular telephones, and the like. The instructions to provide recommendation engine 150 may be stored in memory 306 or obtained through input ports 312 and network ports 314.

In some embodiments, listener computing device 210 comprises an inter-connect 308 (e.g., bus, system core logic, or the like), which facilitates communication between the various components of computing device 210 such as, without limitation, processor(s) 304 and memory 306. Furthermore, inter-connect 308 can allow microprocessor 304 and/or memory 306 to communicate with peripheral devices, including those connected via input ports 312 and output ports 310. Input ports 312 and output ports 310 can communicate with I/O devices such as mice, keyboards, modems, network interfaces, printers, scanners, video cameras and other devices. In addition, output port 310 can further communicate with a display.

Interconnect 308 may also comprise one or more buses connected to one another through various bridges, controllers and/or adapters. In one embodiment, input ports 312 and output ports 310 can include a USB (Universal Serial Bus) adapter for controlling USB peripherals, and/or an IEEE-1394 bus adapter for controlling IEEE-1394 peripherals. Inter-connect 308 can also include one or more network ports 314, through which the listener computing device can be communicatively coupled with a communications network.

In some embodiments, memory 306 may include ROM (Read Only Memory), and volatile RAM (Random Access Memory) and non-volatile memory, such as hard drive, flash memory, computer-readable media, or the like. Volatile RAM is typically implemented as dynamic RAM (DRAM), which requires power continually in order to refresh or maintain the data in the memory. Non-volatile memory is typically a magnetic hard drive, flash memory, a magnetic optical drive, or an optical drive (e.g., a DVD RAM), or other type of memory system which maintains data even after power is removed from the system. Computer-readable media can include, without limitation, recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks, (DVDs), etc.), or the like.

In some embodiments, memory 306 can be a local device coupled directly to the other components or modules in the data processing system. A non-volatile memory that is remote from the system, such as a network storage device coupled to the data processing system through a network interface such as a modem or Ethernet interface, can also be used.

In some embodiments, routines executed to implement one or more embodiments may be implemented as part of an operating system 318 or a specific application, component, program, object, module or sequence of instructions, collectively referred to herein as application software 316. Application software 316 typically comprises one or more instructions sets that can be executed by microprocessor 304 to perform operations necessary to execute elements involving the various aspects of the methods and systems described herein. By way of example, without limitation, application software 316 can include recommendation engine 150 and/or database 240.

Figure 4:
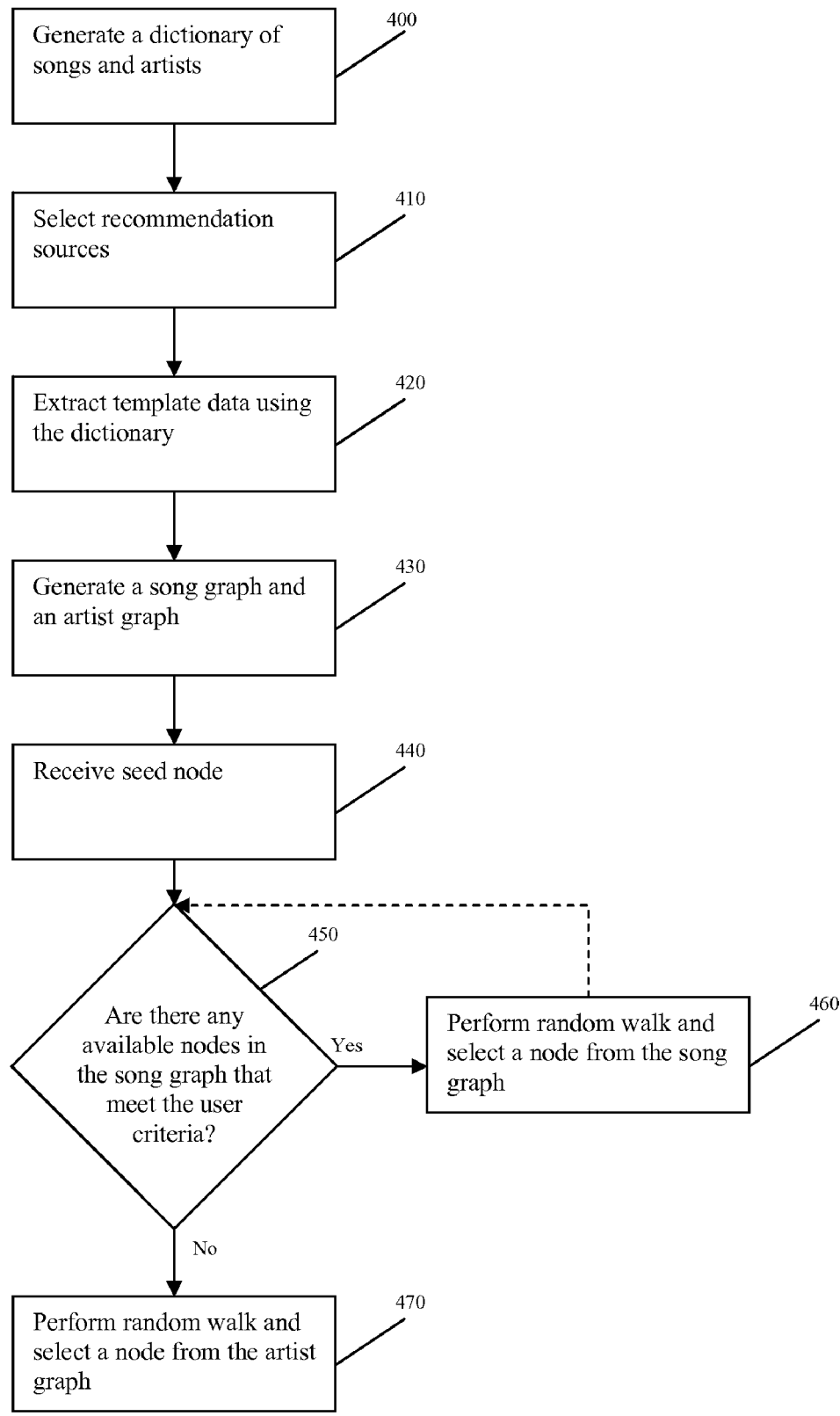
FIG. 4 is a block diagram illustrating an exemplary method for recommending songs in accordance with an embodiment.

FIG. 4 is a block diagram illustrating a method for recommending songs according to various embodiments. In Block 400, a dictionary 110, containing artist names and song titles, is generated. The artist names and song titles can be provided by one or more music information sources, such as, but not limited to Yahoo! Music, Gracenote, freedb, or the like. In some embodiments, a listener's personal music library can be used as the sole music information source during dictionary generation, or such information may be combined with one or more of the music information sources listed above.

In block 410, one or more recommendation sources are selected and added to a crawl list. In some embodiments, a recommendation source is selected after the listener reviews information about the recommendation source. After reviewing the recommendation source information, the listener can assign a weight to the information gathered from the recommendation source. By way of example, without limitation, the listener may assign a higher weight to their favorite DJ and a lower weight to a friend's playlist. By doing so, the listener can instruct the instant system to more frequently rely on song sequence data received from their favorite DJ in instances where the two recommendation sources provide diverging data. In some embodiments, recommendation sources and their weights may be pre-selected by a third party. By way of example, without limitation, if the recommendation source is a web page, the quality of the page, including but not limited to factors such as PageRank and the number of inbound links associated with the page, can be used to determine the weighting for the extracted playlist.

In block 420, crawler 120 extracts song sequence data from recommendation sources in the crawl list. Song sequence data is typically stored in a limited number formats, such as, but not limited to, tables, line delimited sequences, bulleted sequences, Moving Picture Experts Group Audio Layer 3 Uniform Resource Locator ("M3U"), the format described in U.S. patent application Ser. No. 11/688,657 which is assigned to the assignee of the instant application, or the like. In some embodiments, crawler 120 can identify which portions of a recommendation source contain song sequence data by utilizing template extraction techniques. By way of example, without limitation, a recommendation source may contain song sequence data stored as a table in Hyper Text Markup Language ("HTML") as listed below in Table 1.

TABLE 1

```
<tr>
    <td class="programtime">7:14</td>
    <td ><img src="/images/div_v_programs.gif"
width="11" height="17" border="0"></td>
    <td ><a
href="/playlist/buymusic.asp?refer=playlist&PlayID=862401"><img
src="/images/btn_buy.gif" hspace="1" vspace="1"
border="0"></a> Artist 1</td>
    <td ><img src="/images/div_v_programs.gif"
width="11" height="17" border="0"></td>
    <td >Song 1</td>
    <td ><img src="/images/div_v_programs.gif"
width="11" height="17" border="0"></td>
    <td >Album 1</td>
    <td ><img src="/images/div_v_programs.gif"
width="11" height="17" border="0"></td>
    <td >Record Label 1</td>
</tr>
<tr>
    <td class="programtime">7:09</td>
    <td ><img src="/images/div_v_programs.gif"
```

TABLE 1-continued

```
        width="11" height="17" border="0"></td>
            <td ><a
        href="/playlist/buymusic.asp?refer=playlist&PlayID=862399"><img
        src="/images/btn_buy.gif" hspace="1" vspace="1"
        border="0"></a> Artist 2</td>
            <td ><img src="/images/div_v_programs.gif"
        width="11" height="17" border="0"></td>
            <td >Song 2</td>
            <td ><img src="/images/div_v_programs.gif"
        width="11" height="17" border="0"></td>
            <td >Album 2</td>
            <td ><img src="/images/div_v_programs.gif"
        width="11" height="17" border="0"></td>
            <td >Record Label 2</td>
        </tr>
```

By way of example, without limitation, dictionary 110 may contain "Artist 1." Crawler 120, upon finding an instance of "Artist 1" in Table 1, would begin processing the recommendation source using template extraction techniques, without requiring specific, pre-determined knowledge of how the song sequence data is presented by the recommendation source.

Crawler 120 extracts song sequence data for each song present in the recommendation source. In some embodiments, the extracted song sequence data can include multiple fields, such as, but not limited to, artist, title, subsequent song artist, subsequent title, or the like. By way of example of a template extraction technique, without limitation, crawler 120 can scan Table 1 and determine that each table row element (denoted as "<tr>" in Table 1) corresponds to a new song. In such an exemplary template extraction technique, the information in Table 1 would be interpreted as containing two songs, a first song titled "Song 1" by "Artist 1", from album "Album 1", distributed by "Label 1"; and, a second song titled "Song 2" by "Artist 2", from album "Album 2", distributed by "Label 2." Crawler 120 can utilize the contents of the "programtime" table cells (denoted as "<td>" in Table 1) for a variety of purposes, including, without limitation, to determine whether the songs listed in the recommendation source are listed in ascending or descending order and to determine the approximate length of the song.

In block 430, song graph 130 and artist graph 140 are generated. In some embodiments, each song is represented by a node in song graph 130 and each artist is represented by a node in artist graph 140. In some embodiments song graph 130 and artist graph 140 are undirected graphs, whereas in other embodiments they are directed graphs such as an hierarchically arranged representation of the crawler generated data, or the graphs illustrated in FIGS. 5 and 6.

Each node of song graph 130 contains the song artist and song title. Nodes can contain additional metadata fields, such as, but not limited to, album title, genre, release year, producer, label, beat tempo, volume level, or the like. Additionally, each node has one or more edges associated with it denoting its relationship to one or more additional nodes. Each edge can contain a weighting value that denotes how favorable the edge is according to the data extracted from the recommendation sources. The weighting value can depend on a number of factors including, but not limited to, the recommendation source(s) from which the edge was generated, the frequency of occurrence within recommendation sources, or the like. Each factor can be maintained as a separate weighting value or they may be combined into a single, composite weighting value.

Figure 5:
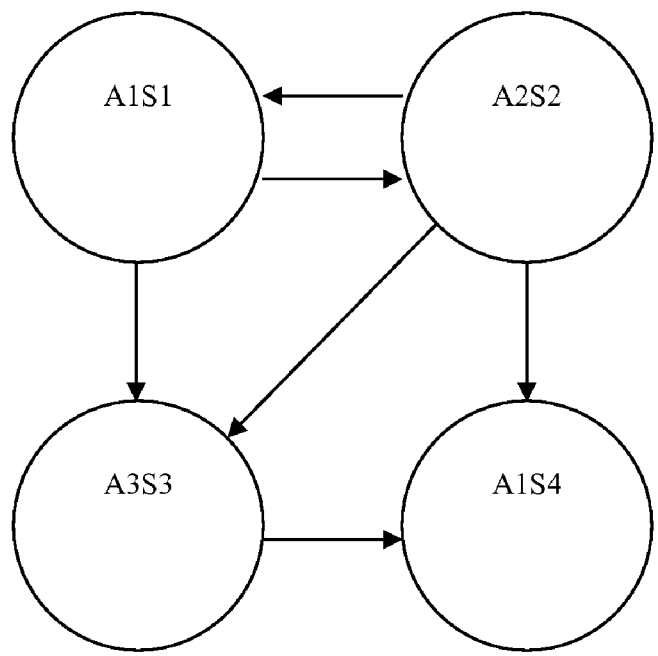
FIG. 5 is a diagram illustrating an exemplary song graph in accordance with an embodiment.
Figure 6:
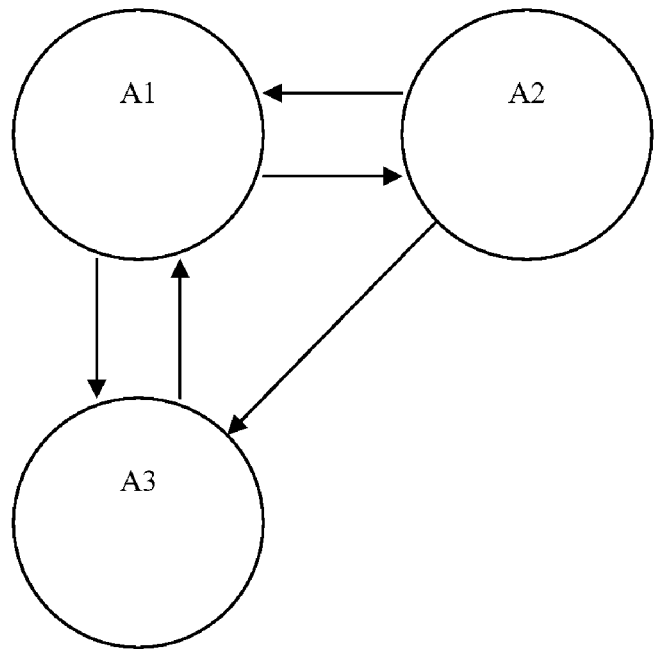
FIG. 6 is a diagram illustrating an exemplary artist graph in accordance with an embodiment.

By way of example, without limitation, a directed song graph containing four song nodes {A1S1 (Artist 1, Song 1), A2S2, A3S3, A1S4}, is illustrated in FIG. 5. The song graph contains six edges; {{A1S1,A2S2}, {A2S2,A1S1}, {A2S2, A3S3}, {A1S1,A3S3}, {A2S2,A1S4}, {A3S3,A1S4}}. Each song graph edge comprises one or more weights, the value of which will be discussed in further detail below. An artist graph, generated from the same data set used to generated the song graph is illustrated in FIG. 6. The artist graph contains three artist nodes {A1, A2, A3} and five edges {{A1, A2}, {A2,A1}, {A1,A3}, {A3,A1}, {A2,A3}}. Each artist graph edge comprises one or more weights, the value of which will be discussed in further detail below.

Referring back to FIG. 4, in block 440, a seed node is selected from song graph 130. In some embodiments, the seed node can comprise a song selected by the listener, the last song played by the listener, a song chosen at random, or the like.

In block 450, the instant system and method determines whether there are any available nodes in song graph 130 that meet criteria selected by the listener. Each song node has metadata associated with it that can be used to filter possible song sequences according to the listener selected criteria. Referring to FIG. 5, by way of example, if A3S3 was chosen as the input node and the listener selected criteria eliminated the {A3S3,A1S4} edge, A3S3 would not have any available song nodes associated with it. By way of example, without limitation, the {A3S3,A1S4} edge could be eliminated by the listener selected criteria specifying that two songs released in the same year are not to be played one after another if A3S3 and A1S4 were both released in 1971.

In block 460, in accordance with some embodiments, the instant system and method performs a random walk of the available song nodes of song graph 130 if there are available song nodes. The probability of selecting a song node is determined by the weight assigned to an edge associated with that song node. Referring to FIG. 5, for example, if A1S1 is selected as the seed node, A1S1 has two edges, {A1S1,A3S3} and {A1S1,A2S2}. If the weights associated with the two edges are 0.2 and 0.8 respectively, when a random walk is performed, the instant system is four times more likely to select edge {A1S1,A2S2} than edge {A1S1,A3S3}. The weight can comprise a single composite weight or comprise multiple weights that can independently affect the random walk. In some embodiments, the listener can add weight modifiers that enhance or detract from the effect that each weight has on the random walk.

In block 470, in accordance with some embodiments, the instant system and method performs a random walk of artist graph 140 if there are no available song nodes. By way of example, without limitation, if, during the course of a random walk of the song graph, there are no unvisited or desirable links from the current song node, or if the current song node does not have any edges associated therewith, the artist node corresponding to the artist for the current song node may be selected in the artist graph. The instant system and method can then examine the artists associated with the existing artist node to obtain a next artist node. This can be accomplished, for example, by performing a random walk of those artist nodes sharing an edge with the existing artist node. Next, using techniques such as those for traversing graphs, the corresponding artist song node closest to the existing current song node can be selected—this then becomes the subsequent song node.

In some embodiments, if there are no available song nodes on song graph 130 or artist nodes on artist graph 140, the next song node may be selected randomly. In some embodiments, one or more listener selected criteria may be ignored if the listener selected criteria would eliminate all available song nodes and artist nodes.

In some embodiments, recommendation engine 150 can provide song recommendations while the listener is playing music on listener computing device 210. In some embodiments, recommendation engine 150 can provide song recommendations to build a playlist of a set duration. By way of example, without limitation, a listener may desire an hour long playlist for working out. The listener can select a seed node corresponding to their favorite workout song and recommendation engine 150 would generate playlist containing approximately one hour of songs based up on the seed node. In some embodiments, recommendation engine 150 can be utilized to build playlists having a specific number of songs, or playlists in which the corresponding songs collectively require a specified amount of storage space.

In some embodiments, recommendation engine 150 can be included in or operate in conjunction with an online music subscription service. Yahoo! Music is one such an online music subscription service. Recommendation engine 150 could provide song recommendations to a listener at various points during their interaction with the online music subscription service, such as, but not limited to, during searches, after listening to a song preview, after selecting a song for purchase, or the like. Recommendation engine 150 or other such modules or components may obtain digital rights management rights for the user, as appropriate. Such rights may be obtained, for example, using the techniques describe in U.S. patent application Ser. No. 11/688,657.

Some online music subscription services, such as, but not limited to, Yahoo! Unlimited, offer unlimited access to their song library for a monthly fee. In some embodiments, recommendation engine 150 can be used to select songs for transfer to the subscriber's listener computing device or portable media player.

While detailed and specific embodiments of the system and method for recommending songs have been described herein, it will be apparent to those skilled in the art that various changes and modifications can be made therein without departing from the spirit and scope of the system and method for recommending songs. Thus, it is intended that the present disclosure cover these modifications and variations provided they come within the scope of any appended claims and/or their equivalents.

What is claimed is:

1. Computer program process code tangibly stored on computer readable storage media and interpretable by a processor running on a computing device, the computer program process code comprising instructions for recommending songs, the instructions comprising modules for implementing:
a dictionary comprising a plurality of terms;
a crawler extracting song sequence data from a plurality of published recommendation sources based on the plurality of terms stored in the dictionary;
a database, the database further comprising a song graph, the song graph being generated by the crawler, the song graph comprising a plurality of song nodes, each song node representing a song and at least a subset of the plurality of song nodes sharing an edge with at least one other song node, each edge representing a sequence relationship from the extracted song sequence data; and
a recommendation engine, the recommendation engine receiving an input node and providing a song recommendation by selecting a next node from the song graph.

2. The computer program process code of claim 1, at least a subset of the song node edges having a weight associated therewith, the recommendation engine performing a weighted random walk of songs sharing an edge with the input node when selecting a next song from the song graph.

3. The computer program process code of claim 1 further comprising a stored set of listener preferences, the recommendation engine applying the listener preferences when providing a song recommendation.

4. The computer program process code of claim 3, each song node comprising metadata, the metadata comprising an artist associated with a song represented by the song node, and further comprising instructions for implementing an artist graph, the artist graph being generated by the crawler, the artist graph comprising a plurality of artist nodes each representing an artist, at least a subset of the artist nodes comprising metadata, the metadata comprising an artist name and song title, and at least a subset of the artist nodes further comprising at least one edge, each edge comprising a weight.

5. The computer program process code of claim 4, the recommendation engine performing a weighted random walk along the artist graph based on the artist associated with the input node if the listener preferences prevent the selection of any song nodes sharing an edge with the input node or if no edges are associated with the input node.

6. The computer program process code of claim 1, the plurality of dictionary terms comprising terms provided by a published recommendation source, the published recommendation sources being stored in an ordered crawl list, at least a subset of the published recommendation sources in the ordered crawl list having a weight associated therewith, the weight associated with a song node being based at least in part on the weight associated with the recommendation source contributing a song to the song graph.

7. Computer program process code, tangibly stored on at least one computer readable storage medium and executable by a processor running on a computing device, the computer program process code comprising instructions for:
extracting song sequence data from a plurality of published recommendation sources based on at least a subset of the contents of a dictionary;
generating a song graph, the song graph comprising a plurality of song nodes, each song node representing a song and at least a subset of the song nodes sharing an edge with at least one other song node, each such edge representing sequence relationships from the extracted song sequence data; and,
selecting a next song for presentation to a listener by:
receiving a first song;
selecting as an input node the song node corresponding to the first song;
selecting a next song node by performing a random walk from the input node to a song node sharing an edge with the input node; and,
selecting the song associated with the selected next song node to the listener.

8. The computer program process code of claim 7, each edge comprising a weight.

9. The computer program process code of claim 8, the random walk comprising a weighted random walk, the weighting provided by the weight of each edge associated with the input node.

10. The computer program process code of claim 9 further comprising storing the selected song in a playlist.

11. The computer program process code of claim 10 further comprising iteratively equating the selected next song node to the input node; selecting a next song node by performing a random walk from the input node to a song node sharing an edge with the input node; and, storing the song associated with the selected next song node in the playlist.

12. The computer program process code of claim 11 further comprising generating a dictionary, the dictionary comprising a plurality of terms provided by a music selection source.

13. The computer program process code of claim 11 further comprising generating an artist graph, the artist graph comprising a plurality of artist nodes, each artist node representing an artist, at least a subset of the artist nodes comprising metadata about the artist represented by the artist node, at least a subset of the artist nodes further comprising at least one edge, each edge comprising a weight.

14. The computer program access code of claim 13 further comprising:
    filtering the edges associated with the input node based upon criteria selected by the listener and metadata associated with each input node;
    selecting the next song node by performing a weighted random walk along the artist graph if filtering the edges associated with the input node eliminates all of the edges associated with the input node or if no edges are associated with the input node; and,
    selecting as the next song the song associated with the next song node.

15. The computer program process code of claim 7, wherein the instructions for extracting song sequence data and the instructions for generating the song graph are executed by a processor running on a server.

16. A method for selecting a next song comprising:
    extracting, by a computing device, song sequence data from a plurality of published recommendation sources based on at least a subset of the contents of a dictionary;
    generating, by the computing device, a song graph, the song graph comprising a plurality of song nodes, each song node representing a song and at least a subset of the song nodes sharing an edge with at least one other song node, each such edge representing sequence relationships from the extracted song sequence data; and,
    selecting, by the computing device, a next song to be presented to a listener by: receiving a first song;
        selecting as an input node the song node corresponding to the received song;
        selecting a next song node by performing a random walk from the input node to a song node sharing an edge with the input node; and,
        selecting as the next song the song associated with the selected next song node.

17. The method of claim 16, each song node comprising metadata, each edge comprising a weight, and the random walk comprising a weighted random walk, the weighting provided by the weight of each edge associated with the input node.

18. The method of claim 16 further comprising:
    storing the selected song in a playlist;
    iteratively equating the selected next song node to the input node;
    selecting a next song node by performing a random walk from the input node to one of the song nodes sharing an edge with the input node; and,
    storing in the playlist the song corresponding to the next song node.

19. The method of claim 16 further comprising generating the dictionary, the dictionary comprising a plurality of terms, each term provided by a music selection source.

20. The method of claim 16 further comprising: generating an artist graph, the artist graph comprising a plurality of artist nodes, each artist node representing an artist, at least a subset of the artist nodes comprising metadata and at least a subset of the artist nodes further comprising at least one edge, each edge comprising a weight.

21. The method of claim 20 further comprising:
    filtering the edges associated with the input node based upon criteria selected by the listener and metadata associated with each input node;
    selecting a song node by performing a weighted random walk along the artist graph if filtering the edges associated with the input node eliminates all of the edges associated with the input node; and,
    recommending a song node to the listener based upon the weighted random walk along the artist graph.

22. A system for selecting next songs comprising:
    a server, having a processor:
        a dictionary stored on a dictionary storage accessible to the server comprising a plurality of terms;
        a crawler executing at least in part on the processor to crawl a network and extract song sequence data from a plurality of published recommendation sources based on the plurality of terms stored in the dictionary; and,
        a database stored on a database storage accessible to the server, the database further comprising a song graph, the song graph being generated by the crawler, the song graph comprising a plurality of song nodes, each song node representing a song and at least a subset of the song nodes sharing an edge with at least one other song node, each such edge representing sequence relationships from the extracted song sequence data.

23. The system of claim 22 further comprising:
    a recommendation engine, the recommendation engine receiving an input node and selecting a next song by selecting a next node from the song graph and selecting as the next song the song corresponding to the next node.

24. The system of claim 23, the server further comprising the recommendation engine.

25. The system of claim 23 further comprising a listener device, the listener device comprising the recommendation engine.

* * * * *